United States Patent
Connors et al.

(10) Patent No.: US 9,363,943 B2
(45) Date of Patent: Jun. 14, 2016

(54) SELF-ALIGNING HEAD BRACKET SYSTEM AND METHOD

(71) Applicant: CNH Industrial America LLC, New Holland, PA (US)

(72) Inventors: Michael J. Connors, Lockport, IL (US); Patrick Dinnon, Plainfield, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 48 days.

(21) Appl. No.: 14/540,865

(22) Filed: Nov. 13, 2014

(65) Prior Publication Data
US 2016/0135360 A1 May 19, 2016

(51) Int. Cl.
| | |
|---|---|
| *A01C 7/08* | (2006.01) |
| *A01C 7/20* | (2006.01) |
| *B23K 31/02* | (2006.01) |
| *B22D 17/20* | (2006.01) |

(52) U.S. Cl.
CPC ............... *A01C 7/082* (2013.01); *A01C 7/084* (2013.01); *A01C 7/201* (2013.01); *B22D 17/20* (2013.01); *B23K 31/02* (2013.01)

(58) Field of Classification Search
CPC ........ A01C 11/00; A01C 7/042; A01C 7/044; A01C 7/046; A01C 7/082; A01C 7/084
USPC ....................... 111/174, 175, 179, 185, 52, 69
See application file for complete search history.

(56) References Cited

U.S. PATENT DOCUMENTS

| | | | |
|---|---|---|---|
| 4,843,983 A | 7/1989 | Olson | |
| 5,842,428 A | 12/1998 | Stufflebeam et al. | |
| 5,923,262 A | 7/1999 | Fuss et al. | |
| 5,996,516 A | 12/1999 | Benneweis et al. | |
| 6,079,340 A | 6/2000 | Flamme et al. | |
| 6,230,636 B1 * | 5/2001 | Bom ...................... | A01B 49/06 111/13 |
| 6,308,646 B1 | 10/2001 | Luxon | |
| 6,516,733 B1 | 2/2003 | Sauder et al. | |
| 6,584,920 B1 | 7/2003 | Cresswell | |
| 6,644,225 B2 | 11/2003 | Keaton | |
| 6,702,062 B2 * | 3/2004 | Kusabiraki .............. | F01N 13/08 181/212 |
| 6,708,756 B2 * | 3/2004 | Parola .................. | B23K 1/0012 165/178 |

(Continued)

FOREIGN PATENT DOCUMENTS

| | | |
|---|---|---|
| AU | 647168 | 3/1994 |
| EP | 0160370 A1 | 11/1985 |

(Continued)

OTHER PUBLICATIONS

"vSet Vacuum System Install Guide;" Precision Planting; Jul. 1, 2010; pp. 11 and 15.

*Primary Examiner* — John G Weiss
(74) *Attorney, Agent, or Firm* — Rebecca L. Henkel

(57) ABSTRACT

One embodiment describes a self-aligning head bracket for a seed planting implement. The self-aligning head bracket includes a securing element that secures the head bracket to a hollow support frame of the seed planting implement and to support a row unit; and a vacuum port fixedly coupled to the securing element. The vacuum port interfaces with an opening in the hollow support frame to establish at least a portion of a pneumatic path between an interior of the hollow support frame and the row unit and to facilitate alignment of the row unit on the hollow support frame.

20 Claims, 5 Drawing Sheets

(56) References Cited

U.S. PATENT DOCUMENTS

| | | |
|---|---|---|
| 6,718,891 B1 | 4/2004 | Burbage, Jr. et al. |
| 6,725,788 B2 * | 4/2004 | McCartney ............ A01C 7/042 |
| | | 111/175 |
| 6,748,885 B2 | 6/2004 | Sauder et al. |
| 7,093,548 B2 | 8/2006 | Eben et al. |
| 7,104,204 B2 | 9/2006 | McCartney |
| 7,162,962 B2 | 1/2007 | Fuessel et al. |
| 7,249,449 B2 | 7/2007 | Goering et al. |
| 7,373,890 B2 | 5/2008 | Kowalchuk |
| 7,490,565 B2 | 2/2009 | Holly |
| 7,555,990 B2 | 7/2009 | Beaujot |
| 7,665,409 B2 | 2/2010 | Johnson |
| 7,717,048 B2 | 5/2010 | Peterson et al. |
| 7,971,579 B2 * | 7/2011 | Heald ...................... 123/568.17 |
| 8,352,130 B2 | 1/2013 | Mitchell |
| 8,360,691 B2 | 1/2013 | Moretto |
| 8,408,478 B2 | 4/2013 | Wonderlich |
| 8,418,634 B2 | 4/2013 | Shoup |
| 8,511,242 B2 | 8/2013 | Applegate et al. |
| 8,516,969 B2 | 8/2013 | Wendte et al. |
| 8,649,942 B2 | 2/2014 | Mitchell |
| 8,857,353 B2 | 10/2014 | Kowalchuk |
| 8,869,718 B2 | 10/2014 | Binsirawanich et al. |
| 8,893,630 B2 | 11/2014 | Kowalchuk |
| 9,253,940 B2 * | 2/2016 | Wilhelmi ................ A01C 7/081 |
| 2009/0118910 A1 | 5/2009 | Carr et al. |
| 2011/0272939 A1 | 11/2011 | Stettner et al. |
| 2012/0265410 A1 | 10/2012 | Graham et al. |
| 2013/0192503 A1 | 8/2013 | Henry et al. |
| 2013/0202370 A1 | 8/2013 | Moretto |
| 2013/0209180 A1 | 8/2013 | Moretto |
| 2014/0041564 A1 * | 2/2014 | Gilstring ................ A01C 7/046 |
| | | 111/174 |
| 2014/0048002 A1 | 2/2014 | Grimm et al. |
| 2014/0165890 A1 | 6/2014 | Graham |
| 2014/0182495 A1 | 7/2014 | Wendte et al. |
| 2014/0261118 A1 | 9/2014 | Mayerle |
| 2014/0277959 A1 | 9/2014 | Wagers et al. |
| 2016/0021815 A1 * | 1/2016 | Redman .................. A01C 7/20 |
| | | 111/149 |

FOREIGN PATENT DOCUMENTS

| | | |
|---|---|---|
| EP | 0958726 | 11/1999 |
| EP | 1135980 | 9/2001 |
| EP | 1329149 | 7/2003 |
| EP | 1348326 | 10/2003 |
| EP | 2047735 | 4/2009 |
| EP | 2253187 | 11/2010 |
| EP | 2420121 | 2/2012 |
| WO | 03055291 | 7/2003 |
| WO | 2005011359 | 2/2005 |
| WO | 2008155234 | 12/2008 |
| WO | 2008155235 | 12/2008 |
| WO | 2013046114 | 4/2013 |
| WO | 2014093575 | 6/2014 |
| WO | 2014150962 | 9/2014 |

\* cited by examiner

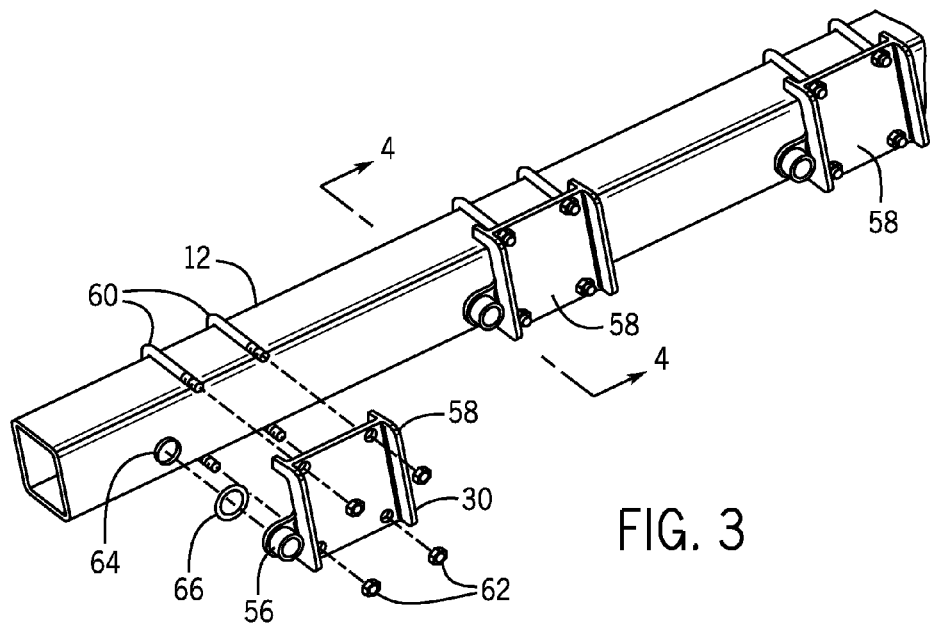
FIG. 3
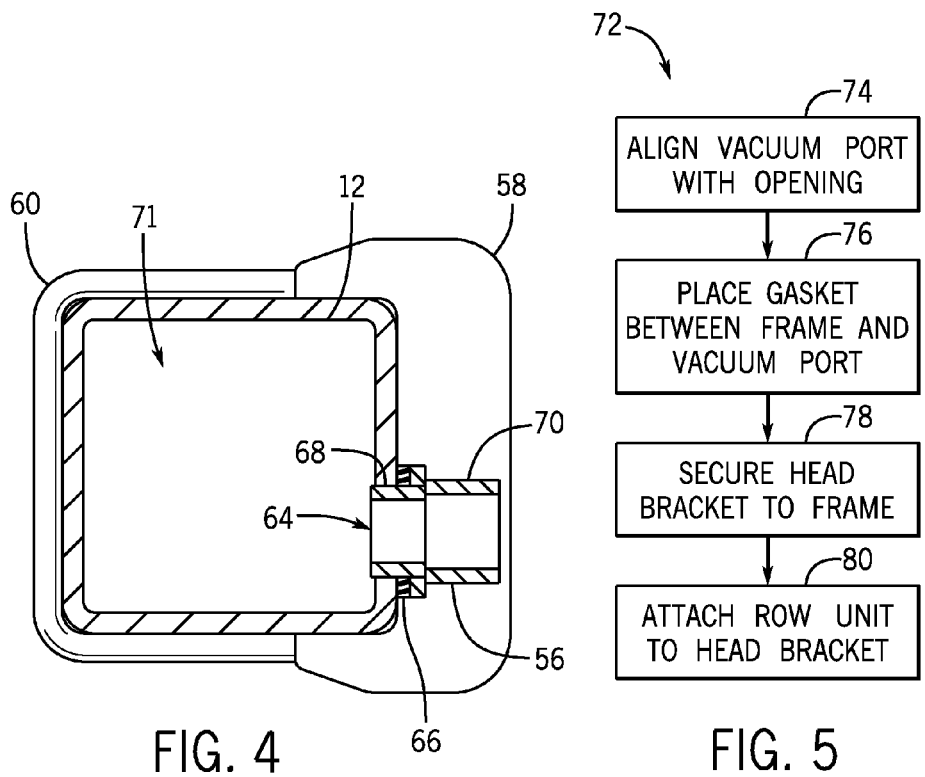
FIG. 4
FIG. 5

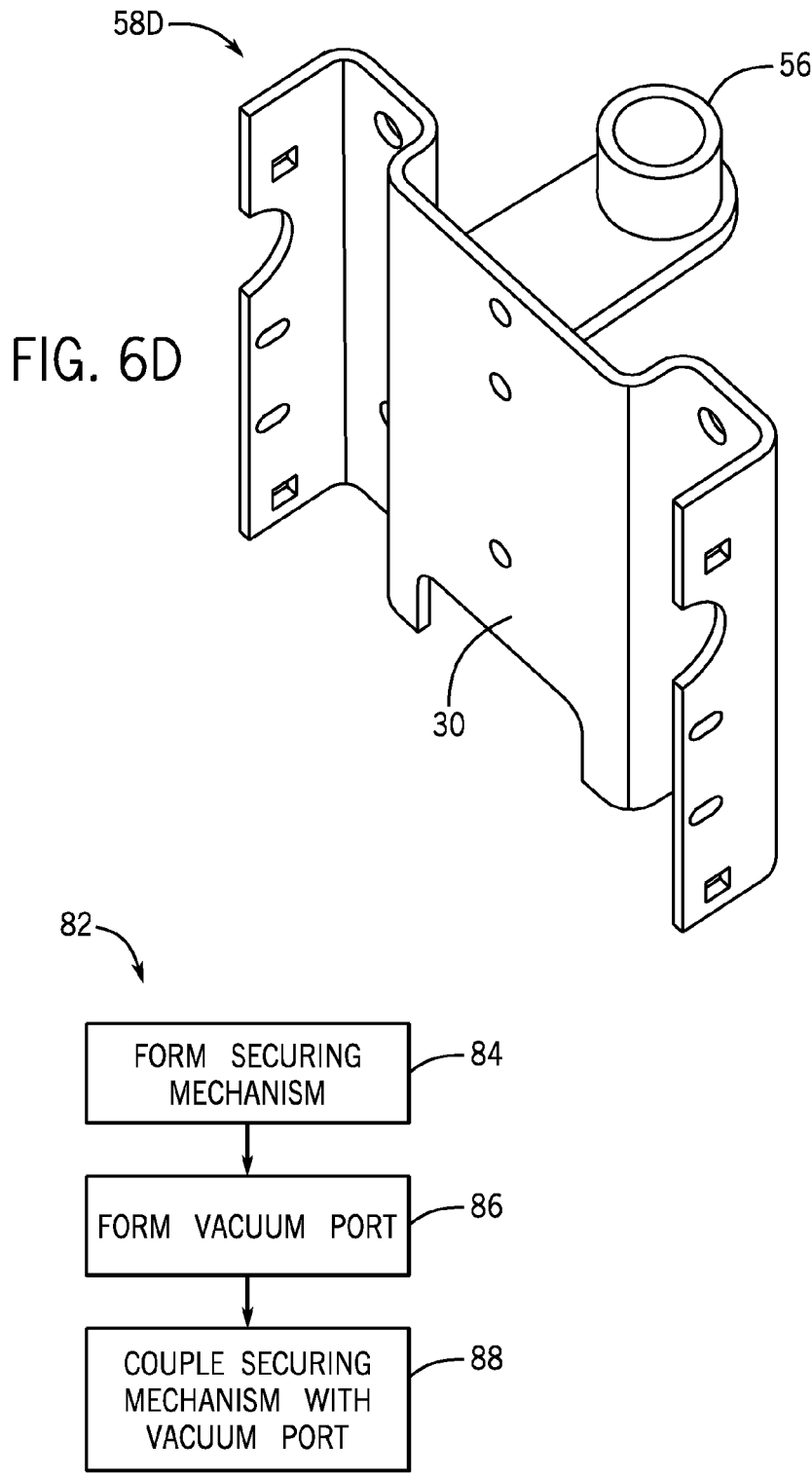

SELF-ALIGNING HEAD BRACKET SYSTEM AND METHOD

BACKGROUND

The present disclosure relates generally to seed planting implements and, more particularly, to assembly/reassembly of seed planting implements.

Generally, planting implements (e.g., planters) are towed behind a tractor or other work vehicle via a hitch secured to a support frame of the planting implement. These planting implements typically include multiple row units distributed across the width of the planting implement, which are used to deposit seeds at a desired depth beneath the soil surface, thereby establishing rows of planted seeds. Thus, each of the row units may be secured to the support frame so that they move along with the rest of the planting implement.

Additionally, each row unit may include a pneumatic seed meter that controls the seed flow rate and/or the spacing of seeds deposited in the ground. More specifically, the seed meters may utilize a vacuum pressure to attach seeds to a seed disc, which is used to control the output of seeds from the seed meter. Thus, a vacuum pressure source may be pneumatically coupled to each seed meter. Accordingly, assembling a planting implement may include attaching each row unit to the planting implement frame and routing vacuum lines to each seed meter, as well as additional assembly steps.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a self-aligning head bracket for a seed planting implement. The self-aligning head bracket includes a securing element that secures the head bracket to a hollow support frame of the seed planting implement and to support a row unit; and a vacuum port fixedly coupled to the securing element. The vacuum port interfaces with an opening in the hollow support frame to establish at least a portion of a pneumatic path between an interior of the hollow support frame and the row unit and to facilitate alignment of the row unit on the hollow support frame.

A second embodiment describes a method for assembling a seed planting implement that includes aligning a first vacuum port of a first self-aligning head bracket with a first opening in a hollow support frame of the seed planting implement; securing a first securing element of the first self-aligning head bracket to the hollow support frame such that the first vacuum port interfaces with the first opening; and coupling a first row unit to the first securing element such that the first row unit is coupled a first lateral distance from the first opening.

A third embodiment describes a method for manufacturing a self-aligning head bracket for a seed planting implement. The method includes forming a securing element that secures a row unit to a hollow support frame of the seed planting implement; forming a vacuum port that interfaces with an opening in the hollow support frame; and fixedly coupling the securing element and the vacuum port to one another based at least in part on a desired spatial relationship between the row unit and the opening.

DRAWINGS

These and other features, aspects, and advantages of the present invention will become better understood when the following detailed description is read with reference to the accompanying drawings in which like characters represent like parts throughout the drawings, wherein:

FIG. 3 is a perspective view of a plurality of self-aligning head brackets coupled to a support frame on the planting implement of FIG. 1, in accordance with an embodiment;

FIG. 4 is a cross-sectional view of the support frame and a self-aligning head bracket of FIG. 3, taken along line 4-4;

FIG. 5 is a flow diagram of a process for assembling a planting implement using a self-aligning head bracket, in accordance with an embodiment;

FIG. 6D is a perspective view of another embodiment of a self-aligning head bracket; and FIG. 7 is a flow diagram of a process for manufacturing a self-aligning head bracket, in accordance with an embodiment.

DETAILED DESCRIPTION

Figure 1:
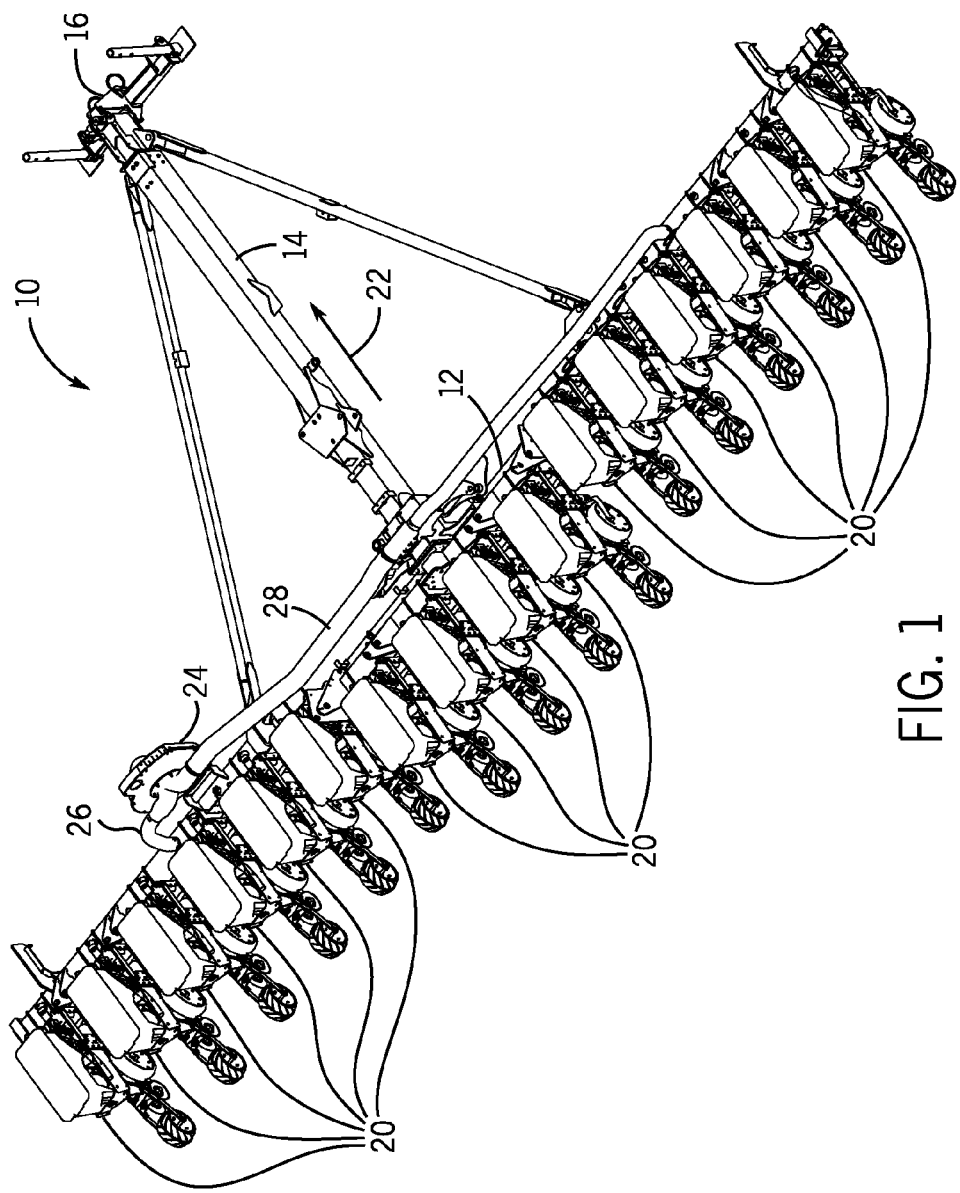
FIG. 1 is a perspective view of an embodiment of a planting implement that deposits seeds into a soil surface.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A planting implement may be towed by a work vehicle to plant rows of seeds. More specifically, each row of seeds may be deposited in the soil by a row unit. As such, to assemble the planting implement, row units may be secured to a support frame of the planting implement using a securing element (e.g., a bracket) such that the row units are towed along with the planting implement.

Additionally, each row unit may include a seed meter to control seed flow rate and/or spacing between planted seeds. More specifically, each seed meter may utilize vacuum pressure to attach seeds to a rotating seed disc. As used herein, "vacuum pressure" is intended to describe a pressure differential from atmospheric pressure and not necessarily a true vacuum. As the seed disc rotates, the seeds are detached from the seed disc, for example by blocking the vacuum pressure, and output from the seed meter for deposition into a trench formed in the soil. In other words, vacuum pressure may be supplied to each seed meter on a planting implement. As such, to assemble the planting implement, vacuum hoses may be routed from a vacuum source to each of the seed meters.

In fact, the configuration of the planting implement may be adjusted multiple times during its life span, for example, by adjusting the number and/or spacing of the row units. More specifically, the number of row units attached to the planting implement may be adjusted based on the number of desired seed rows. Additionally, the spacing between row units may be adjusted based on the type of seed being planted. For example, the row units may be spaced 30 inches from one another when planting corn and 15 inches from one another when planting soy beans. As can be appreciated, each time the number and/or spacing of the row units is adjusted, the placement of the securing elements and the routing of the vacuum hoses may also be adjusted.

Accordingly, the present disclosure describes techniques that improve the assembly/reassembly process for a planting implement. Embodiments described herein include a self-aligning head bracket, which includes a vacuum port fixedly attached to a securing element. More specifically, the vacuum port may facilitate routing vacuum pressure from a vacuum source to a seed meter on the row unit. Additionally, the securing element may facilitate securing a row unit to the planting implement. Furthermore, as will be described in more detail below, since the securing element and the vacuum port may be fixedly attached, placement of the vacuum port may facilitate locating the securing element, and thus the row units, as desired. For example, in some embodiments, the placement of the securing element may be determined by aligning the vacuum port with an opening on a support frame of the planting implement.

Thus, as will be described in more detail below, using self-aligning head brackets may improve the assembly process of a planting implement. For example, the self-aligning head bracket may enable the positioning of the securing element to be determined via the placement of the vacuum port, which may obviate much if not all of the measuring that would otherwise be used to locate each securing element. As such, the assembly process may be improved by simplifying the assembly of the planting implement and by reducing the number of assembly steps.

Furthermore, as discussed above, the configuration of a planting implement may be adjusted multiple times over the course of its lifespan. With each such configuration adjustment, portions of the planting implement may be reassembled, for example, by changing the location of the securing elements and/or the vacuum routing. As such, the techniques described herein may also improve each subsequent reassembly (e.g., reconfiguration) of the planting implement. For example, when a first self-aligning head bracket is used, the securing element may be located one inch away from the vacuum port, but when a second self-aligning head bracket is used, the securing element may be located five inches away from the vacuum port. In other words, the location of the securing element, and thus the corresponding row unit, may be adjusted simply by using different self-aligning head brackets.

To help illustrate, an embodiment of a planting implement 10 is shown in FIG. 1. As depicted, the planting implement 10 includes a hollow support frame 12, a tow frame 14, a hitch assembly 16, and row units 20. More specifically, one end of the tow frame 14 is connected to the hollow support frame 12 and the other end is connected to the hitch assembly 16, which enables a work vehicle, such as a tractor or other prime mover, to be coupled to the planting implement 10. Thus, when a work vehicle is coupled to the hitch assembly 14, the planting implement 10 may be towed along a direction of travel 22 by the work vehicle.

Additionally, as depicted, a plurality of row units 20 is coupled to the hollow support frame. Thus, as the work vehicle tows the implement 10, each of the row units 20 may deposit seeds at a desired depth beneath the soil surface, thereby establishing rows of planted seeds. It should be noted that while the illustrated implement 10 includes sixteen row units 20, the number of row units 20 may be adjusted based on a desired number of seed rows. In other words, the planting implement 10 may be adjusted to include 6, 8, 12, 16, 24, 32, or 36 row units, or more.

Furthermore, as described above, the spacing between row units may be selected based on the type of seed being planting. For example, the row units may be spaced 30 inches from one another when planting corn, and 15 inches from one another when planting soy beans. As such, the number and/or spacing of the row units 20 may be adjusted multiple times during the lifespan of the planting implement 10.

As described above, the row units 20 may control the planting of seeds. More specifically, each row unit 20 may utilize vacuum pressure to control the seed flow rate and/or the spacing between planted seeds. Accordingly, in the depicted embodiment, a vacuum source 24 is mounted on the support frame 12. In the depicted embodiment, the planting implement 10 utilizes a single centralized vacuum source. Additionally or alternatively, multiple vacuum sources may be used. For example, a first vacuum source may supply vacuum pressure to half of the row units 20, and a second vacuum source may supply vacuum pressure to the other half of the row units 20.

In some embodiments, the vacuum source 24 may be a fan that displaces air to generate vacuum pressure. For example, the vacuum source 24 may expel air from the row units 20 to generate a negative vacuum pressure. Thus, any suitable vacuum source 24 may be utilized, such as a hydraulically driven fan, an electrically drive fan, and so forth. Moreover, embodiments of the fan may include an axial fan, a blower-type fan, a plurality of parallel fans, a plurality of sequential fans, a turbine-type fan, or any combination thereof.

To facilitate distributing the vacuum pressure, a conduit or tubing system may be used to pneumatically couple the vacuum source 24 to the hollow frame structure 12. For example, in the depicted embodiment, a conduit 26 is used to pneumatically couple the vacuum source 24 to a left portion of the hollow frame structure 12. Additionally, a conduit 28 is used to pneumatically couple the vacuum source 24 to a middle portion and a right portion of the hollow frame structure 12. In other embodiments, any number of conduits may be used.

More specifically, pneumatically coupling the vacuum source 24 to the hollow support frame 12 enables the vacuum source 24 to force air through a hollow interior of the support frame 12. The forced air flow may create a pressure drop (e.g., a negative vacuum pressure) in the conduits 26 and 28 and the hollow support frame 12. Thus, in some embodiments, the hollow support frame 12 may include one or more hollow metal beams mechanically coupled together. In other embodiments, the hollow support frame 12 may be made out of any suitable structural material, such as a composite material or durable plastic. Furthermore, the hollow support frame 12 may have a generally rectangular cross section with hollow interior. In other words, the hollow support frame 12 may function as a load bearing support (e.g., structural support) as well as a vacuum pressure conduit.

Figure 2:
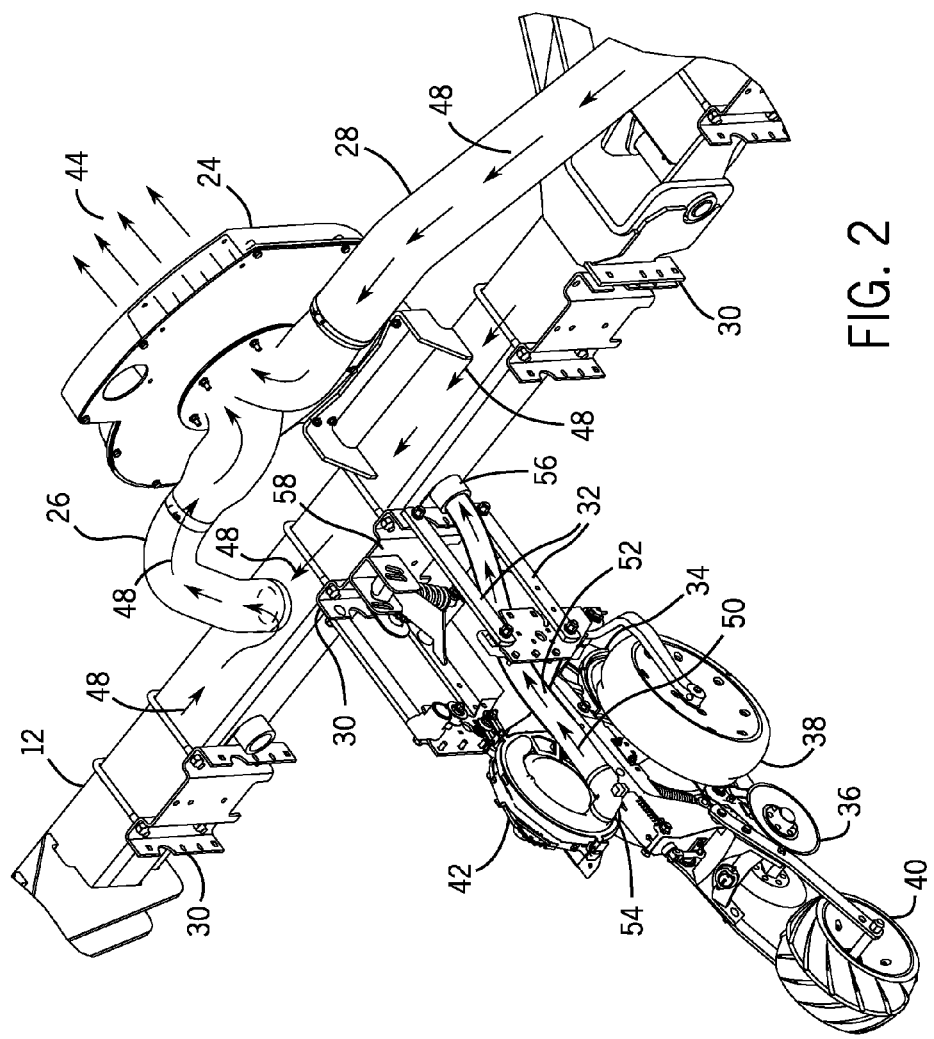
FIG. 2 is a perspective view of a portion of the planting implement of FIG. 1.

In the depicted embodiment, the hollow support frame 12 may then route the vacuum pressure to the individual row units 20, and more particularly to the individual seed meters, to control the planting of seeds. To help illustrate, an embodiment of a single row unit 20 connected to the hollow support frame 12 is shown in FIG. 2. In the depicted embodiment, the seed hopper is removed for clarity.

As described above, a row unit 20 may deposit seeds as the planting implement 10 is towed by a work vehicle. Accordingly, as depicted, the row unit 20 is coupled to the hollow support frame 12 via a securing element 30 (e.g., a bracket). More specifically, the row unit 20 may include parallel linkages 32 that couple to the securing element 30. In some embodiments, the parallel linkages 32 may enable vertical motion of the row units 20.

To facilitate depositing seeds, the row unit 20 may include an opener disc 34, a closing disc 36, a gauge wheel 38, a press wheel 40, and a seed meter 42. More specifically, as the row unit 20 travels, the opener disc 34 engages the soil and forms a trench for seeds to be deposited at a depth determined by the gauge wheel 38. The seeds may be stored in the seed hopper (not depicted) before they are deposited. From the seed hopper, the seeds may be transferred to the seed meter 42. The seed meter 42 may then output the seeds to a seed tube such that the seeds travel down the seed tube and into the trench. Once the seeds are deposited, the closing disc 36 may cover the seeds and the press wheel 40 may pack the soil onto the seeds.

As described above, the seed meter 42 may utilize vacuum pressure to control the flow of the seeds. Accordingly, as depicted, the seed meter 42 is pneumatically coupled to the vacuum source 24. To help illustrate, the seed meter 42 is described as utilizing a negative vacuum pressure.

As depicted, to generate a negative vacuum pressure the vacuum source 24 expels air (arrow 44) and causes the illustrated air flow. More specifically, upon enabling the vacuum source 24, a pressure differential is generated within the conduits 26 and 28 and the hollow interior of the hollow support frame 12. In the depicted embodiment, a first portion of the air flow 46 is within the conduits 26 and 28 and a second portion of the air flow 48 is within the hollow interior of the hollow support frame 12.

A third portion of the air flow 50 is between the hollow interior of the support frame 12 and the seed meter 42. As depicted, to facilitate the third portion of the air flow 50, the seed meter 42 is pneumatically coupled to the hollow support frame 12 via a vacuum hose 52. More specifically, the vacuum hose 52 may be coupled at one end to a vacuum input 54 of the seed meter 42 and at the other end to a vacuum port 56.

In addition to facilitating the flow of vacuum pressure to the seed meter 42, the vacuum port 56 may facilitate the positioning of the securing element on the support frame 12. More specifically, as depicted, the vacuum port 56 is fixedly coupled to the securing element 30. In other words, the vacuum port 56 and the securing element 30 may be a single unit. For the purpose of the presented disclosure, the securing element 30 and the vacuum port 56 are collectively referred to as a self-aligning head bracket 58.

To more clearly illustrate the self-aligning head bracket 58, a perspective view of multiple self-aligning head brackets 58 coupled to the hollow support frame 12 is depicted in FIG. 3. As depicted, each self-aligning head bracket 58 is secured to the hollow support frame 12 using U-bolts 60 and nuts 62. More specifically, the U-bolts 60 wrap around the exterior surface of the support frame 12. Thus, the nuts 62 may be coupled to the ends of the U-bolts 60 to secure the head bracket 58 to the support frame 12. Accordingly, to remove the head bracket 58 from the support frame 12, the nuts 62 may be removed from the U-bolts 60. Accordingly, each head bracket 58 may be removably coupled to the support frame 12.

Additionally, as depicted, the vacuum port 56 is coupled to an opening 64 of the hollow support frame 12 such that the vacuum pressure from the interior of the hollow support frame 12 may flow to the vacuum port 56. More specifically, in the depicted embodiment, a gasket 66 is disposed between the vacuum port 56 and the opening 64. Thus, as the head bracket 58 is secured, the gasket 66 may reduce the possibility of vacuum pressure leaking from between the opening 64 and the opening 64. Accordingly, in some embodiments, the gasket 66 may be made of rubber or another suitable material.

Moreover, since the vacuum port 56 is fixedly coupled to the securing element 30, the positioning of the vacuum port 56 may determine the positioning of the securing element 30. In other words, alignment of the vacuum port 56 with the opening 64 may be used to self-align the head bracket 58. To help illustrate, a cross sectional view of the hollow support frame 12 and a self-aligning head bracket 58 is depicted in FIG. 4.

In the depicted embodiment, the vacuum port 56 includes a frame coupler 68 and a hose coupler 70. More specifically, the hose coupler 70 may pneumatically connect to the vacuum hose 52. On the other hand, the frame coupler 68 may pneumatically connect to the hollow interior 71 of the support frame 12 via the opening 64. More specifically, in the depicted embodiment, an external surface of the frame coupler 68 may be disposed within the opening 64. Thus, vacuum pressure from within the hollow support frame 12 can flow through the opening 64 to the vacuum port 56.

In other words, vacuum pressure may flow through the seed meter 42, though the vacuum hose 52, to the hose coupler 70, and into the interior of the hollow support frame 12. To reduce the possibility of vacuum pressure leaking, the gasket 66 may be disposed between the opening 64 and the vacuum port 56. More specifically, in the depicted embodiment, the gasket 66 may wrap around an exterior surface of the frame coupler 68 and be disposed between the hose coupler 70 and an external surface of the hollow support frame 12. Thus, when the head bracket 58 is secured to the frame 12, for example via U-bolts 60 and nuts 62, the gasket 66 may be compressed to block flow into an out of the connection between the opening 64 and the vacuum port 56.

Based on the above description, the present technique may improve the assembly/reassembly of a planting implement 10. More specifically, by aligning the vacuum port 56 with the support frame opening 64, each head bracket 58 may be position at a desired lateral location along the frame 12. Thus, the desired number and/or spacing of row units 20 across the planting implement 10 may be achieved. To help illustrate, one embodiment of a process 72 for assembling/reassembling a planting implement 10 is shown in FIG. 5. Generally, the process 72 includes aligning a vacuum port on a head bracket with an opening on a hollow support frame (process block 74), placing a gasket between the support frame and the vacuum port (process block 76), securing the head bracket to the support frame (process block 78), and attaching a row unit to the head bracket (process block 80).

As described above, a self-aligning head bracket 58 includes a securing element 30 and a vacuum port 56. To facilitate positioning the head bracket 58, the vacuum port 56 may be aligned with an opening 64 on the hollow support frame 12 (process block 74). More specifically, the vacuum port 56 may be aligned with the opening 64 such that an external surface of the vacuum port 56 fits within the opening 64. As described above, the vacuum port 56 is fixedly coupled to the securing element. As such, aligning the vacuum port 56 may dictate the positioning of the rest of the head bracket 58, and particularly the securing element 30.

Once the vacuum port 56 is aligned, a gasket 66 may be placed between the vacuum port 56 and the support frame 12 (process block 76). As described above, the gasket 66 may be utilized to improve transfer of vacuum pressure from the interior of the hollow support frame 12 to the vacuum port 56. More specifically, the gasket 66 may close openings that are present between the vacuum port 56 and the frame 12 to reduce leakage of vacuum pressure. As such, the gasket 66 may be wrapped around an exterior surface of the vacuum port 56.

Next, the head bracket 58 may be secured to the support frame 12 (process block 78). In some embodiments, the head bracket 58 may be secured to the support frame 12 via nuts 62 coupled to U-bolts 60 that wrap around the support frame 12. A row unit 20 may then be attached to the head bracket 58 (process block 80). More specifically, the row unit 20 may be attached to the securing element 30 using parallel linkages 32. In other words, the positioning of the row unit 20 on the planting implement 10 may be determined simply by aligning the vacuum port 56 with the opening 64 on the support frame 12.

Accordingly, the assembly/reassembly of a planting implement 10 may be improved through the use of self-aligning head brackets 58. More specifically, the positioning of each row unit 20 may be determined by the self-aligning head bracket 58. In fact, in some embodiments, much if not all of the measuring used to determine desired positioning of each row unit 20 on the support frame 12 may be eliminated. In other words, a desired number and/or a desired spacing of row units 20 on the planting implement 10 may be established by utilizing appropriate head brackets 58.

Moreover, as described above, the number and/or spacing of the row units 20 may be adjusted multiple times over the life span of a planting implement 10. To facilitate the reassembly (e.g., reconfiguration) of the planting implement 10, the self-aligning head brackets 58 may be changed. More specifically, as in the above embodiments, the head bracket 58 may be removably secured to the support frame 12, for example via U-bolts 60 and nuts 62.

As such, the planting implement 10 may easily be reconfigured by changing the head brackets 58. More specifically, different head brackets 58 may have varying spatial relationships between the securing element 30 and the vacuum port 56. For example, the distance between the vacuum port 56 and the securing element 30 and the location of the securing element 30 relative to the vacuum port 56 may vary. Thus, by changing the head brackets 58, the number and/or spacing of the row units 20 on the planting implement 10 may be adjusted.

Figure 6A:
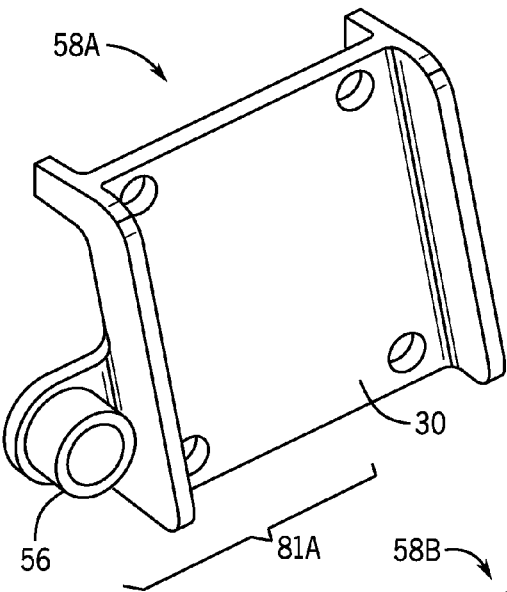
FIG. 6A is a perspective views of an embodiment of a self-aligning head bracket.
Figure 6B:
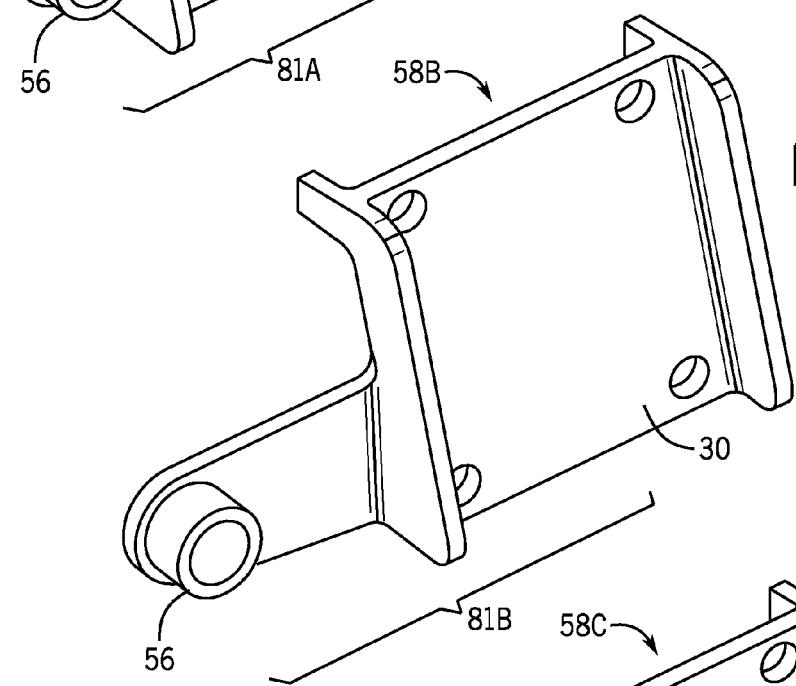
FIG. 6B is a perspective view of another embodiment of a self-aligning head bracket.

To help illustrate, a first embodiment of a head bracket 58A is depicted in FIG. 6A and a second embodiment of a head bracket 58B is depicted in FIG. 6B. As depicted, the distance between the vacuum port 56 and the securing element 30 is different between the first head bracket 58A and the second head bracket 58B. For example, the distance 81A between the first head bracket 58A and the securing element 30 may be one inch. On the other hand, the distance 81B between the second head bracket 58B and the securing element 30 may be three inches. Thus, when the first head bracket 58A is used, a row unit 20 coupled to the first head bracket 58A is secured one inch to the right of the opening 64. On the other hand, when the second head bracket 58B is used, a row unit 20 coupled to the second head bracket 58B is secured three inches to the right of the opening 64.

In addition to varying the distance between the vacuum port 56 and the securing element 30, embodiments of the head bracket 58 may vary what side of the securing element 30 the vacuum port is located on. For example, in the first and second embodiments, the securing element 30 is located to the right of the vacuum port 56. In other embodiments, the securing element 30 may be located to the left of the vacuum port 56. In such embodiments, when a row unit 20 is coupled to the head bracket 58, the row unit 20 is secured to the left of the opening 64.

Figure 6C:
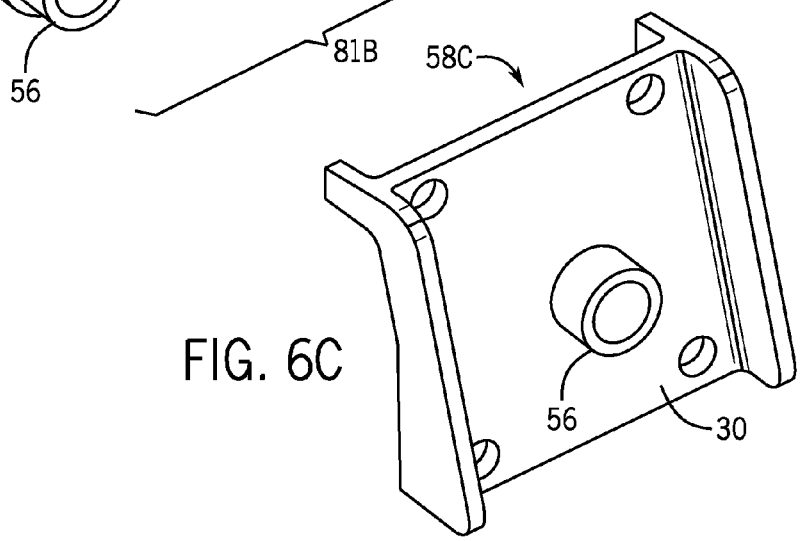
FIG. 6C is perspective view of a further embodiment of a self-aligning head bracket.

In further embodiments, the vacuum port 56 may be located within the securing element 30. To help illustrate, a third embodiment of a head bracket 58C is depicted in FIG. 6C. As depicted, the vacuum port 56 is formed within the footprint (e.g., area) of the securing element 30. As such, when the third head bracket 58C is used, a row unit 20 coupled to the third head bracket 58 is secured in line with the opening 64. Thus, the overall footprint of the self-aligning head bracket 58C may be reduced. In some embodiments, this may increase the available area on the support frame 12 for other components of the planting implement 10.

In fact, the vacuum port 56 may be fixedly coupled to the securing element 30 in any suitable location or position. For example, a fourth embodiment of a head bracket 58D is depicted in FIG. 6D. As depicted, the vacuum port 56 is positioned to couple with an opening on the top surface of the support frame 12. In other embodiments, a head bracket 58 may include a vacuum port 56 that couples to an opening on the bottom surface of a hollow support frame 12.

In each embodiment of a self-aligning head bracket 58, the vacuum port 56 is fixedly coupled to the securing element 30. As such, the configuration of a planting implement 10 may be adjusted by utilizing head brackets 58 with a desired spatial relationship between the securing element 30 and the vacuum port 56. More specifically, a self-aligning head bracket 58 may be selected based on a desired spatial relationship between a row unit 20 and a corresponding hollow support frame opening 64. For example, if it is desired that a row unit 20 be spaced one inch to the right of an opening 64, the first head bracket 58A may be selected. On the other hand, if it is desired that a row unit be spaced three inches to the right of the opening 64, the second head bracket 58B may be selected.

In other words, the location of the row units 20 may be selected in relation to the openings 64 on the hollow support frame 12. Thus, the different head brackets 58 may be manufactured so that the vacuum port 56 and the securing element 30 establish the desired spatial relationship. One embodiment of a process 82 for manufacturing a head bracket 58 is shown in FIG. 7. Generally, the process 82 includes forming a securing element (process block 84), forming a vacuum port (process block 86), and fixedly coupling the securing element to the vacuum port to one another (process block 88).

As described above, the securing element 30 may enable a row unit 20 to be coupled to the support frame 12. Accordingly, any suitable process may be used to form the securing element 30 (process block 84). For example, the securing element 30 may be cast or injection molded from metal. More specifically, the securing element 30 may be formed to include openings for interfacing with the U-bolts 60, such that the head bracket 58 may be secured to the support frame 12. Additionally, the securing element 30 may be formed to include openings for interfacing with the parallel linkages 32, such that a row unit 20 may be coupled to the head bracket 58.

Additionally, as described above, the vacuum port 56 is configure to pneumatically couple the hollow interior 71 of hollow support frame 12 to a vacuum hose 52. Thus, any suitable process may be used to form the vacuum port 56 (process block 86). For example, the vacuum port 56 may also be cast or injection molded from metal. In some embodiments, the vacuum port 56 may be manufactured from the same material as the securing element. More specifically, the vacuum port 56 may be formed to include a frame coupler 68, such that the vacuum port 56 may interface with an opening 64 in the support frame 12. Additionally, the vacuum port 56 may be formed to include a hose coupler 70, such that the vacuum port 56 may be coupled to a vacuum hose 52.

The vacuum port 56 may then be fixedly coupled to the securing element 30 based at least in part on a desired spatial relationship between the row unit 20 and the opening 64 (process block 88). More specifically, the desired spatial relationship may depend on the placement of openings 64 on the support frame 12 and the desired location of the row units 20 in relation to the openings 64. Thus, in some embodiments, the configuration (e.g., spatial relationship between the vacuum port 56 and the securing element 30) of the head brackets 58 may vary across the planting implement 10. In some embodiments, the vacuum port 56 may be welded to the securing element 30 to form a single unit. Thus, when the head bracket 58 is utilized, the desired spatial relationship between the row unit 20 and the opening 64 may be established.

Accordingly, embodiments described herein may provide the technical benefit of improving assembly/reassembly of a planting implement 10. More specifically, the assembly/reassembly may be improved through the use of a self-aligning head bracket. As described above, the self-aligning head bracket may include a securing element, which couples to a row unit, and a vacuum port, which interfaces with a support frame to supply vacuum pressure to the row unit. More specifically, the securing element may be fixedly coupled to the vacuum port. Thus, by aligning the vacuum port with an opening in the support frame, the positioning of the securing element and any row unit coupled to the securing element may be established. In fact, by selecting a different self-aligning head bracket with a different spatial relationship between the vacuum port and the securing element, the positioning of the row unit may be changed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A self-aligning head bracket for a seed planting implement, comprising:
   a securing element configured to secure the head bracket to a hollow support frame of the seed planting implement and to support a row unit; and
   a vacuum port fixedly coupled to the securing element, wherein the vacuum port is configured to interface with an opening in the hollow support frame to:
      establish at least a portion of a pneumatic path between an interior of the hollow support frame and the row unit; and
      facilitate alignment of the row unit on the hollow support frame.

2. The self-aligning head bracket of claim 1, wherein the vacuum port comprises:
   a frame coupler configured to interface with the opening such that an outer surface of the frame coupler is disposed within the opening; and
   a hose coupler configured to pneumatically couple with a vacuum hose to enable vacuum pressure to be supplied from the vacuum port to the row unit via the vacuum hose.

3. The self-aligning head bracket of claim 1, comprising a gasket configured to be disposed between the vacuum port and the hollow support frame.

4. The self-aligning head bracket of claim 1, wherein the head bracket is configured to be removably coupled to the hollow support frame via a U-bolt.

5. The self-aligning head bracket of claim 1, wherein the securing element is configured to couple to the row unit via parallel linkages that enable vertical movement of the row unit.

6. The self-aligning head bracket of claim 1, wherein the vacuum port is fixedly coupled to the securing element within an area of the securing element, wherein the securing element is configured to position the row unit in line with the opening.

7. The self-aligning head bracket of claim 1, wherein the vacuum port is fixedly coupled to the securing element such that the securing element is position on a lateral side of the vacuum port, wherein the securing element is configured to position the row unit on the lateral side of the opening.

8. The self-aligning head bracket of claim 1, wherein the vacuum port is configured to enable air flow from the row unit into the interior of the hollow support frame via the pneumatic path.

9. A method for assembling a seed planting implement, comprising:
   aligning a first vacuum port of a first self-aligning head bracket with a first opening in a hollow support frame of the seed planting implement;
   securing a first securing element of the first self-aligning head bracket to the hollow support frame such that the first vacuum port interfaces with the first opening; and
   coupling a first row unit to the first securing element such that the first row unit is coupled a first lateral distance from the first opening.

10. The method of claim 9, comprising placing a first gasket around an exterior surface of the first vacuum port, wherein the first gasket is secured between the first vacuum port and the hollow support frame.

11. The method of claim 9, comprising:
   aligning a second vacuum port of a second self-aligning head bracket with the first opening;
   securing a second securing element of the second self-aligning head bracket to the hollow support structure such that the second vacuum port interfaces with the first opening; and
   coupling the first row unit to the second securing element such that the first row unit is coupled a second lateral distance from the first opening, wherein the first lateral distance is different from the second lateral distance.

12. The method of claim 9, comprising:
   aligning a second vacuum port of a second self-aligning head bracket with a second opening in the hollow support frame of the seed planting implement;

securing a second securing element of the second self-aligning head bracket to the hollow support structure such that the second vacuum port interfaces with the second opening; and coupling a second row unit to the second securing element such that the second row unit is coupled a second lateral distance from the second opening.

13. The method of claim 9, comprising:

pneumatically coupling a vacuum hose to the first vacuum port; and pneumatically coupling the vacuum hose to a seed meter on the first row unit.

14. The method of claim 9, wherein aligning the first vacuum port comprises aligning the first vacuum port such that an exterior surface of the first vacuum port is insertable within the first opening.

15. The method of claim 9, wherein securing the first securing element comprises:

disposing a U-bolt around an exterior surface of the hollow support frame; and coupling an end of the U-bolt to the first securing element via a nut.

16. The method of claim 9, wherein the first vacuum port is fixedly coupled to the first securing element.

17. A method for manufacturing a self-aligning head bracket for a seed planting implement, comprising:

forming a securing element configured to secure a row unit to a hollow support frame of the seed planting implement;

forming a vacuum port configured to interface with an opening in the hollow support frame; and fixedly coupling the securing element and the vacuum port to one another based at least in part on a desired spatial relationship between the row unit and the opening.

18. The method of claim 17, wherein fixedly coupling the securing element and the vacuum port to one another comprises welding the securing element to the vacuum port.

19. The method of claim 17, wherein forming the securing element and forming the vacuum port comprise injection or cast molding metal.

20. The method of claim 17, wherein forming the securing element comprises forming an opening in the securing element, wherein the opening is configured to interface with a U-bolt.

\* \* \* \* \*